Aug. 13, 1968     J. A. KOZEL     3,396,848
PLASTIC-METAL VALVE
Filed Aug. 20, 1964

INVENTOR.
JAMES A. KOZEL
BY
JOHN E. McRAE

United States Patent Office 3,396,848
Patented Aug. 13, 1968

3,396,848
PLASTIC-METAL VALVE
James A. Kozel, Franklin, Mich., assignor to American-Standard Inc., a corporation of Delaware
Filed Aug. 20, 1964, Ser. No. 390,899
2 Claims. (Cl. 210—137)

This invention relates to liquid valves, and particularly to valves formed partly of plastic such as nylon and partly of metal such as brass. The invention in certain aspects may be considered an improvement on the inventions disclosed in U.S. Patent 2,922,616, issued to J. C. Budde and U.S. Patent 2,936,780 issued to E. J. Pratt.

One object of the present invention is to provide a plastic-metal valve wherein the metal components are used to mount the valve and to connect the valve with the supply pipe without permitting the pipe to engage the plastic component or otherwise transmit a damaging torque thereto as the pipe and valve are being connected together.

Another object is to provide a plastic-metal valve wherein the plastic component is provided with a pocket to accommodate a resilient flow control member and strainer in axial alignment with a metal inlet coupling member which is carried by a metal mounting bracket, whereby to permit ready access to the flow control member and strainer without disconnection of the coupling member from the mounting bracket or the supply pipe.

A further object is to provide a plastic-metal valve which has desired features of low cost, long service life, and easy access to its internal parts.

Other objects of this invention will appear from the following description, accompanying drawings, and appended claims.

Figure 1:
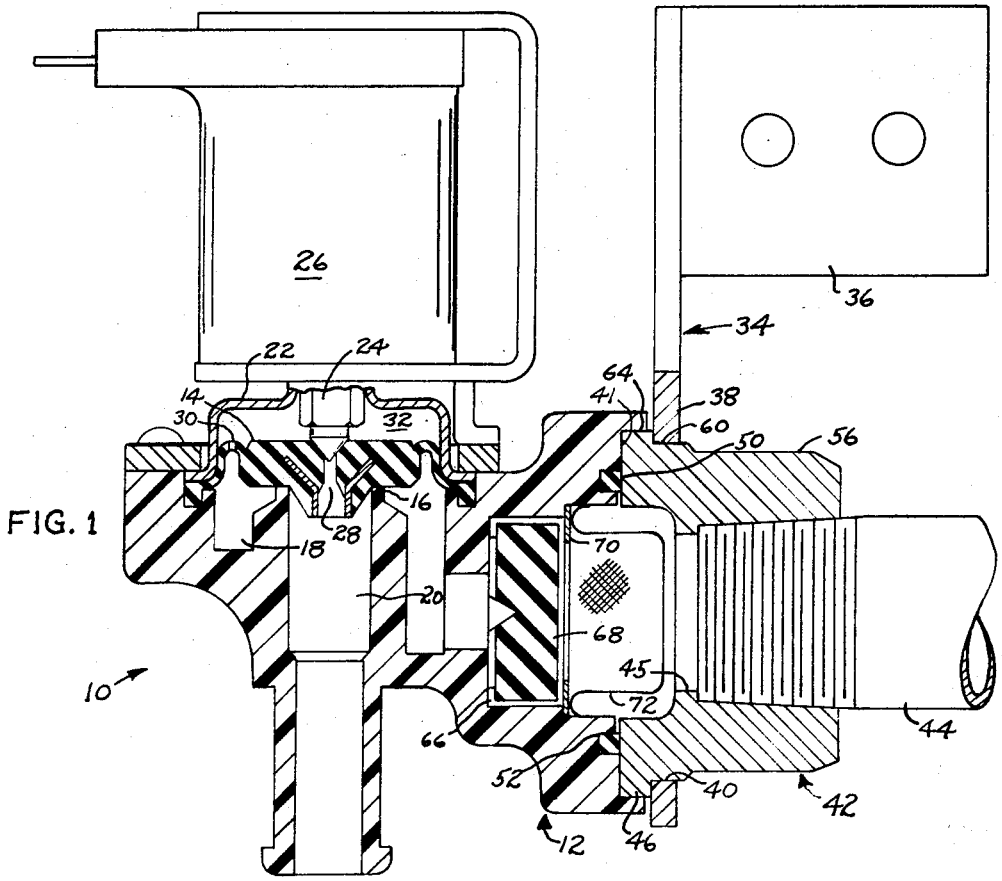
FIG. 1 is a sectional view taken through a valve incorporating features of the invention therein.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a liquid valve 10 comprising a molded plastic valve body 12 which mounts a conventional rubber diaphragm 14. Underlying diaphragm 14 is an annular valve seat 16 which subdivides body 12 into an annular entrance passage 18 and a central exit passage 20. Overlying diaphragm 14 is a metal cover 22 which houses the plunger-type armature 24 of a conventional solenoid 26. Energization of the solenoid raises armature 24 whereby to open the central opening 28 in diaphragm 14 and allow the pressure in passage 18 to raise the diaphragm for permitting the flow of liquid into passage 20. De-energization of the solenoid permits armature 24 to close opening 28, thereby allowing the liquid which has flowed through bleed opening 30 to be trapped in space 32 for thus exerting a downward force on diaphragm 14 to close same against seat 16.

To operatively mount the valve on a suitable support structure, such as the frame of a domestic dishwasher, there is provided a metal mounting bracket 34 which includes a first apertured plate portion 36 and a second plate portion 38. Extending through an enlarged hole 40 in bracket 34 is a tubular metal coupling member 42 which is internally threaded to receive the externally threaded supply pipe 44. Internal flange 45 limits the inward movement of the supply pipe while it is being threaded into the coupling member.

As seen in FIG. 1 the coupling member is provided with a flange 46 which is sandwiched between plate portion 38 and flat face 41 of body 12. To draw the valve body against flange 46 I have used four headed screws 48 which extend through bracket 34 into the valve body. An annular rubber gasket 50 is disposed in a groove 52 to seal the joint between members 12 and 42. Screws 48 insure a continuous sealing engagement between gasket 50 and the surfaces of groove 52 and member 42.

Figure 2:
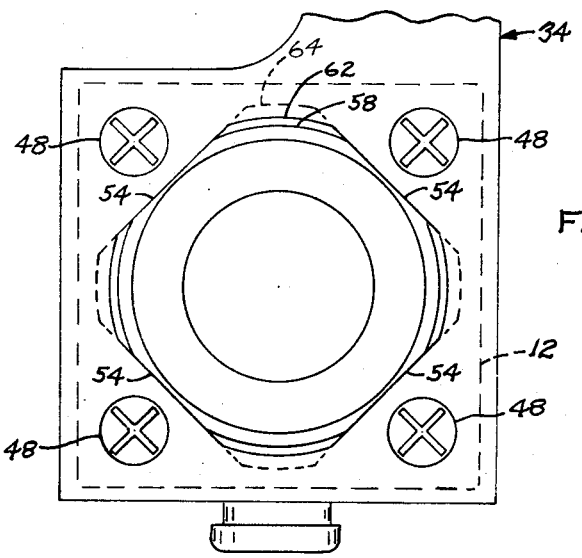
FIG. 2 is a right end elevational view of the FIG. 1 valve.

As seen in FIG. 2 coupling member 42 is of generally square cross section whereby to provide wrench flats 54 which are operable during the process of threading the liquid supply pipe 44 onto the valve coupling. The upstream end portion 56 of the coupling is machined at the corners between adjacent flats 54 to provide a major diameter designated by numeral 58. The intermediate portion 60 of the coupling is machined to provide a slightly larger diameter designated by numeral 62, and the downstream end portion of the coupling is machined to provide a major diameter 64 which is larger than diameter 62. The difference between diameers 64 and 62 constitutes the aforementioned flange 46.

Hole 40 in the mounting bracket is formed to the contour of coupling member portion 60. Therefore the coupling member can be initially assembled onto bracket 34 by passing the coupling member rightwardly through hole 40 until portion 60 snaps into the hole as a press fit. Portion 56 of the coupling member is made undersize to permit easy passage of the coupling member through the bracket during the assembly operation. After assembly of member 42 into bracket 34 the valve body can be fitted onto the end face of member 42 and screws 48 threaded into the plastic body to retain the assembly together. Preferably the end surface of the valve body is recessed to the contour of coupling member flange 46 so that screws 48 are not subjected to torsional or laterally acting stresses.

When the valve is installed on the frame of a dishwasher a supply pipe can be threaded into coupling member 42 without stressing the plastic body because the stress is transferred from member 42 directly to bracket 34. The valve body is free of stress.

It will be noted that valve body 12 is provided with a pocket 66 which accommodates a resilient flow control member 68, a retainer 70, and a hat-like strainer screen 72. Member 68 is preferably a resilient disc having grooves in its downstream face as more particularly shown in co-pending U.S. patent application Ser. No. 231,414 filed Oct. 18, 1962; it functions to pass a substantially constant flow of liquid into passage 18 in spite of substantial variations in supply pressure. The illustrated arrangement of flow control member and strainer screen is conventional in plastic valves of the type sold by American-Standard Controls Division under its designation S-30. However in such conventional arrangements the valve body is connected directly with the supply pipe, whereas in the illustrated arrangement only the metal coupling member 42 is connected with the supply pipe. The illustrated arrangement thus permits the valve body to be disassembled from the mounting means without disturbing the mounting means or supply pipe; access to the strainer and flow control member is thus made easier.

What is claimed is:
1. In combination: a plastic valve body having a face provided with an inlet flow opening; a tubular metal coupling member having a flat end face thereof engaging said valve body face; said coupling member being formed of non-circular stock having a series of flat surfaces extending the length of the member, the upstream end portion of the member having the corners between adjacent flat surfaces machined to provide a first major diameter, the intermediate portion of the member having the corners between adjacent flat surfaces machined to provide a second major diameter slightly larger than the first diameter, and the downstream end portion of the member having a major diameter larger than the second diameter whereby to form a flange; an annular groove in said valve body face surrounding the flow opening and spaced therefrom; a deformable gasket positioned in said groove in sealing engagement with the groove surface and coupling member end face; a mounting bracket for the valve body comprising an apertured plate portion adapted to seat on a mounting surface, and a second plate portion having a non-circular hole therethrough; said metal coupling member having its flange sandwiched between the valve body face and the second plate portion, and having its intermediate portion disposed as a press fit within the non-circular hole; and securing devices operable to draw the valve body tightly against the aforementioned end face of the tubular metal coupling member.

2. In combination: a plastic valve body having a face thereof provided with a pocket constituting an inlet chamber for the valve body; said pocket having a back wall formed with a flow opening therein for conducting liquid from the inlet chamber; a resilient flow control member positioned in said pocket for deformation in the direction of the back wall to provide a substantially constant liquid flow through the chamber irrespective of substantial variations in liquid supply pressure; a retainer disposed within the pocket upstream of the flow control member to retain same in its operative position; a hat-like screen positioned in said inlet chamber upstream of said retainer to filter the liquid prior to its passage across the flow control member; an annular groove formed in said valve body face surrounding the aforementioned pocket; a tubular metal coupling member having a face thereof engaging said valve body face; a deformable gasket positioned in said groove in sealing engagement with the groove surface and coupling member face; mounting bracket means for the valve body comprising a first apertured portion adapted to seat on a mounting surface, and a second portion connected with the tubular metal coupling member; and securing devices extending between the bracket means and plastic valve body to draw the valve body tightly against the aforementioned face of the coupling member.

References Cited
UNITED STATES PATENTS
3,195,561  7/1965  Sovitzky _____ 251—120 X REUBEN FRIEDMAN, *Primary Examiner.*

F. SPEAR, *Assistant Examiner.*